Aug. 30, 1955 E. J. SCHAAF ET AL 2,716,321
STALK EJECTING MECHANISM
Original Filed Jan. 4, 1950 5 Sheets-Sheet 1
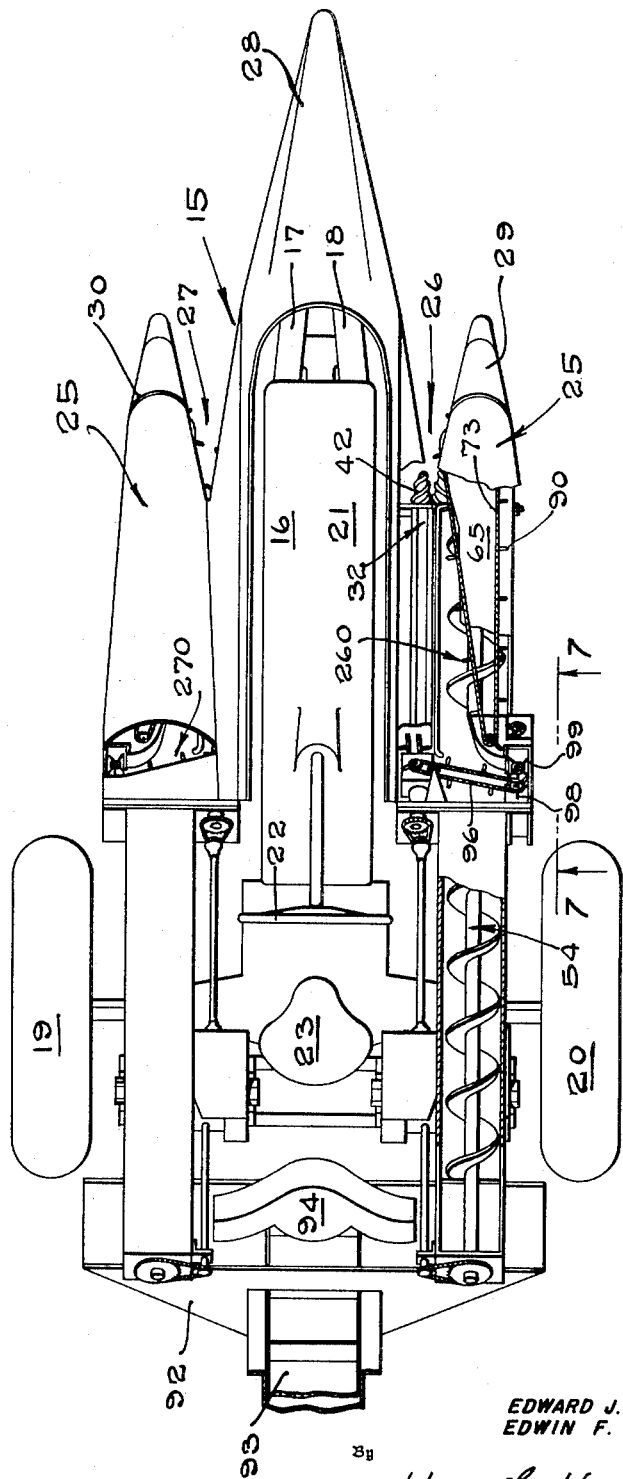
Inventors
EDWARD J. SCHAAF
EDWIN F. GREEDY
By
Hans G. Hoffmeister.
Attorney

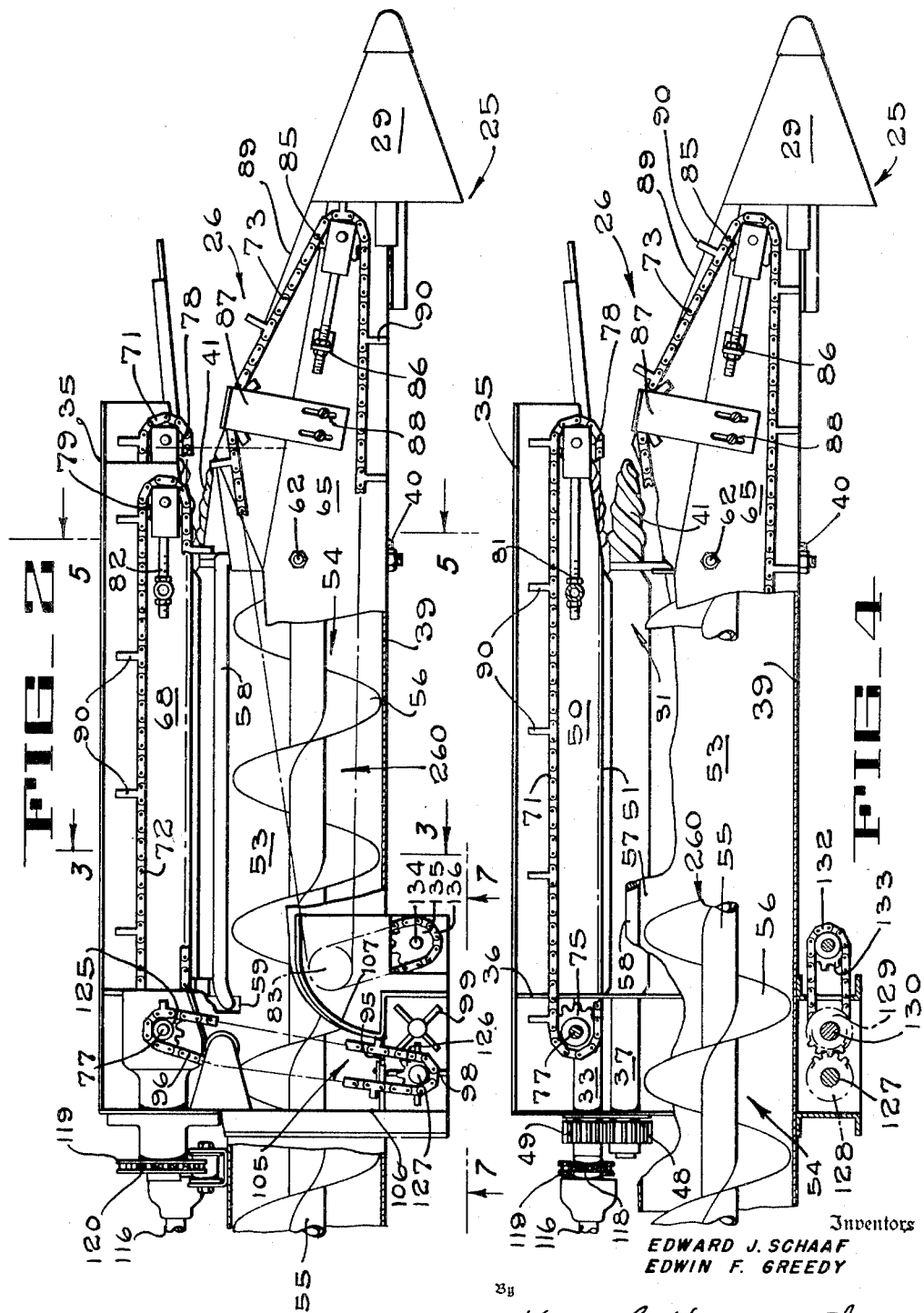

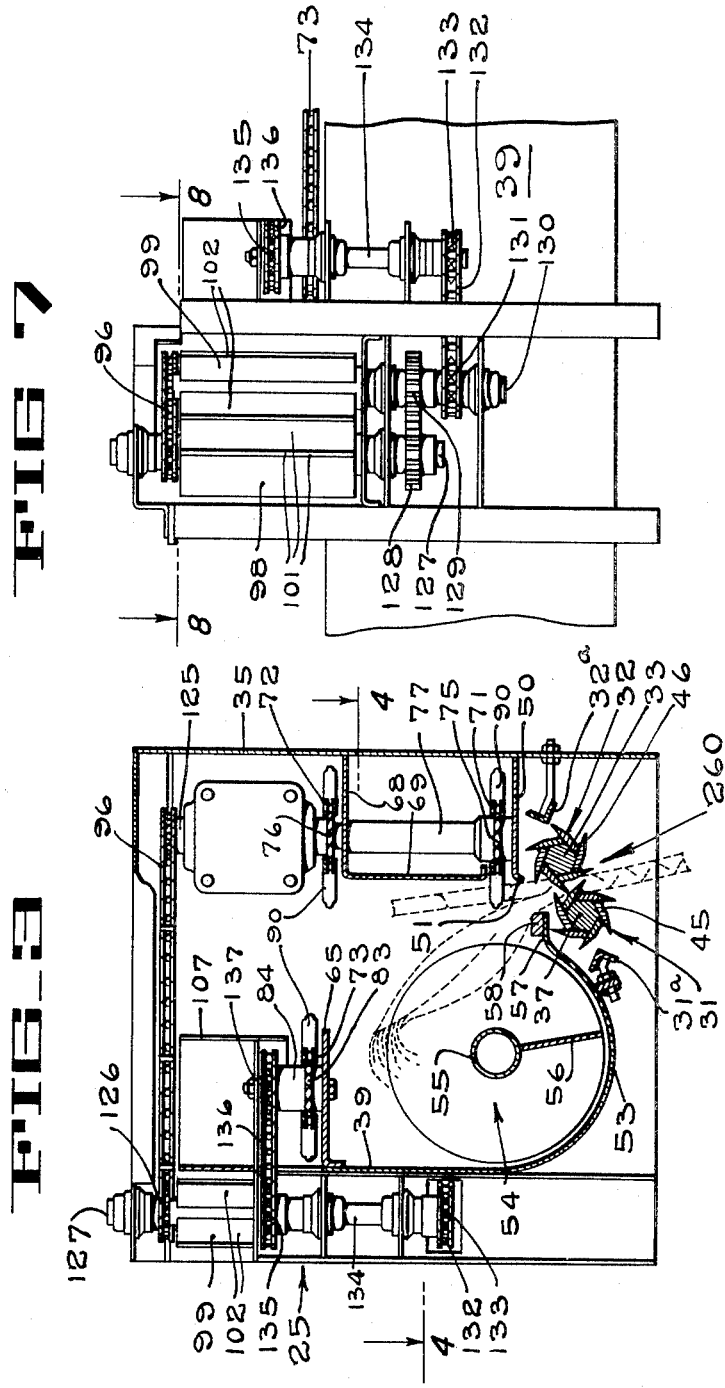

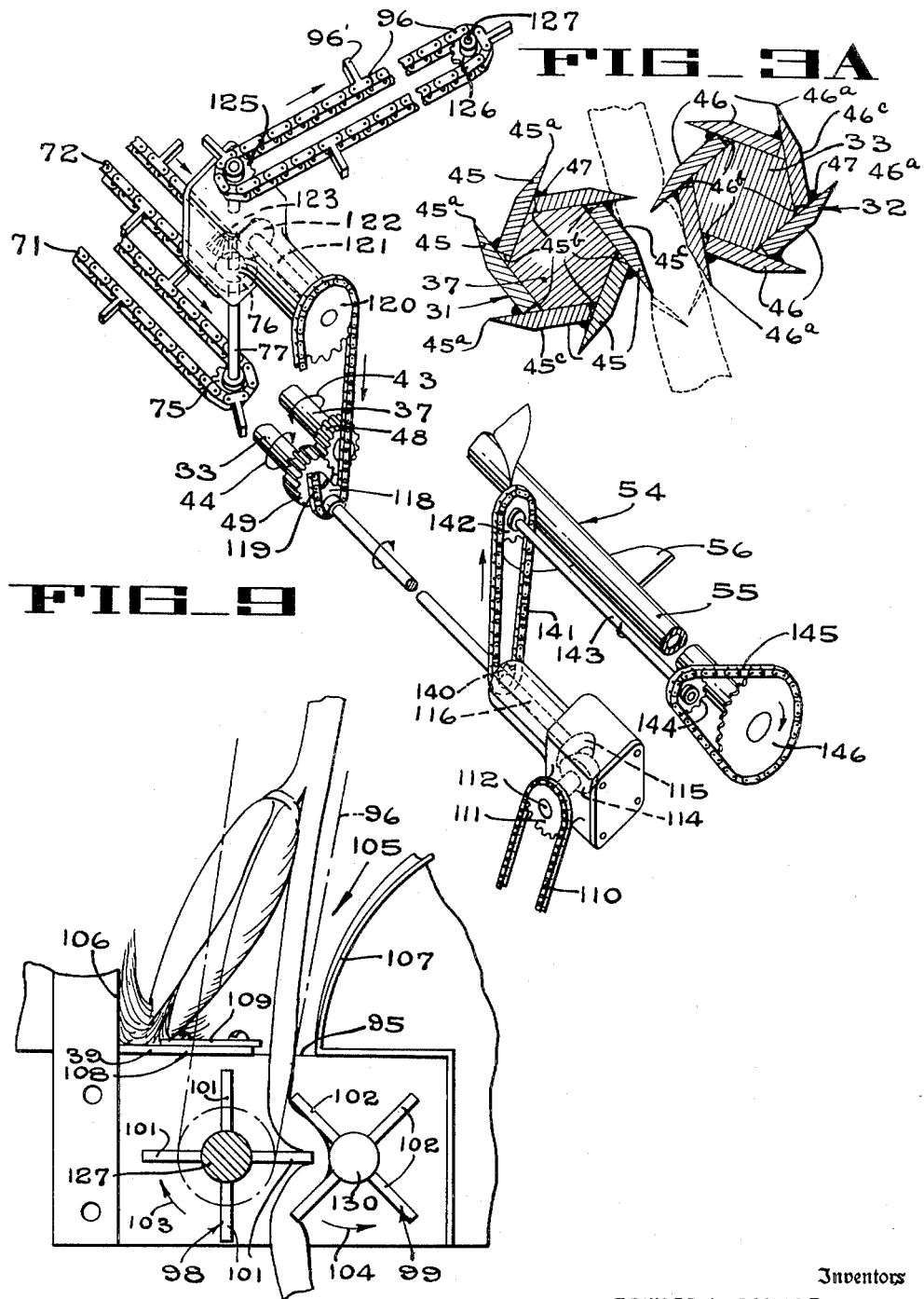

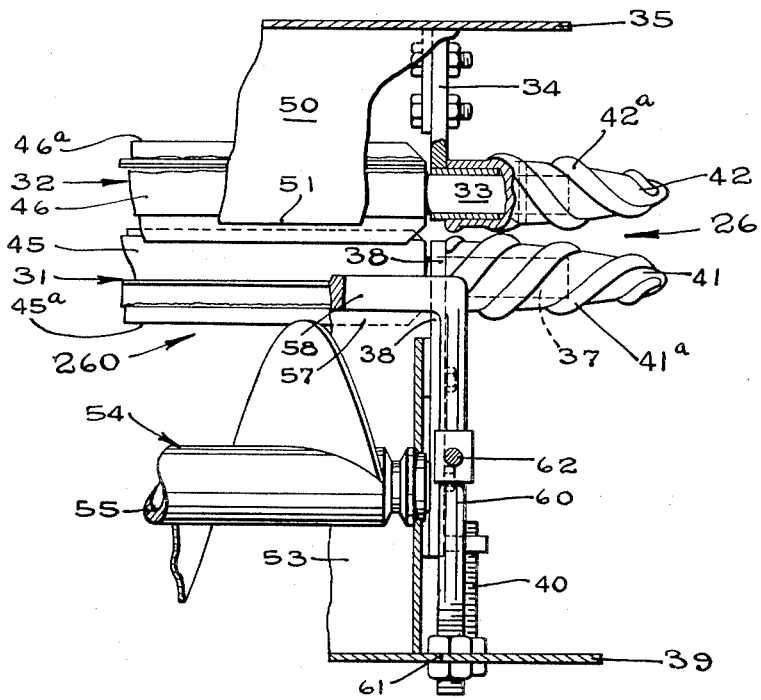
FIG_6
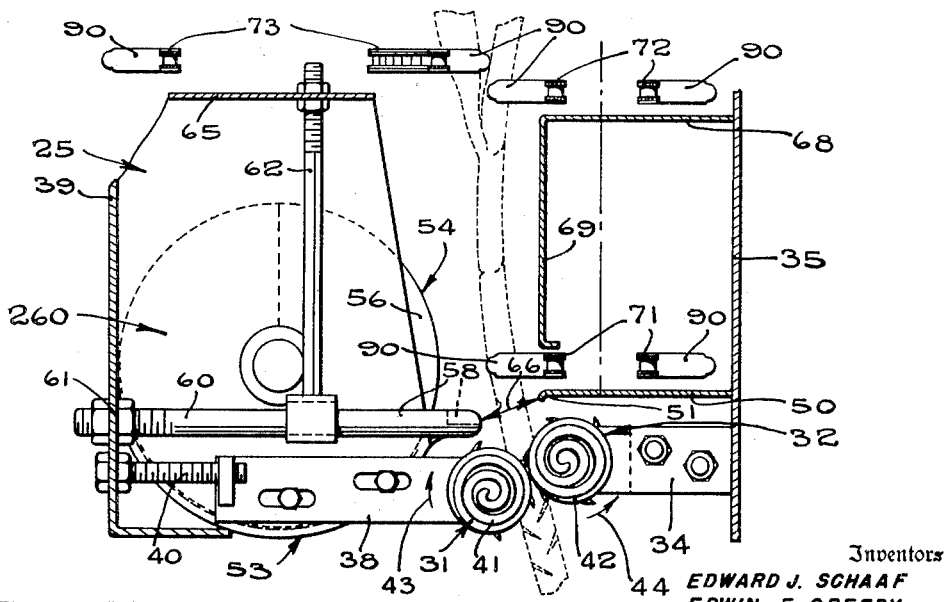
FIG_5
Inventors
EDWARD J. SCHAAF
EDWIN F. GREEDY
By
Hans G. Hoffmeister
Attorney United States Patent Office 2,716,321
Patented Aug. 30, 1955

2,716,321

STALK EJECTING MECHANISM

Edward J. Schaaf and Edwin F. Greedy, Hoopeston, Ill., assignors to Food Machinery and Chemical Corporation, San Jose, Calif., a corporation of Delaware Original application January 4, 1950, Serial No. 136,678, now Patent No. 2,676,450, dated April 27, 1954. Divided and this application February 24, 1953, Serial No. 338,326

14 Claims. (Cl. 56—104)

The present invention relates to novel improvements in stalk ejecting mechanisms. More particularly our invention relates to a stalk ejecting mechanism especially adapted and designed for use with corn-harvesting machines and the like.

This application is a division of our copending application Serial No. 136,678, filed January 4, 1950, for Corn-Harvesting Machine, now Patent No. 2,676,450.

In normal corn-harvesting operations the stalks of corn are rapidly chopped and drawn down their full length to be deposited on the field. However, occasionally the upper portions of some of such stalks will break away or become severed from their respective downwardly moving portions. Further, for one reason or another, whole stalks of corn will on occasion fail to enter and be engaged by the corn stalk processing mechanisms of the corn-harvesting machine picker heads. In either event, the problem arises of efficiently and effectively disposing of such upper stalk portions and/or such whole stalks of corn to prevent the same clogging or jamming the corn-harvesting mechanisms and in general interfering with corn-harvesting machine operations. An additional problem also arises of efficiently and effectively gathering the corn ears from said upper stalk portions and said whole stalks of corn prior to their ejection from the picker head of a corn-harvesting machine.

It is, therefore, the primary object of the present invention to provide a novel and improved stalk ejecting mechanism for a corn-harvesting machine which will effectively and rapidly dispose of severed upper stalk portions and when necessary whole stalks of corn which have failed to follow the normal path of corn stalks disposal during corn-harvesting operations.

Another object is to provide a stalk ejecting mechanism of the type referred to, which, prior to effecting disposal of the upper stalk portions and/or the whole stalks of corn untreated by the picker head corn stalk processing mechanism, will gather the corn ears from said stalk portions and said whole stalks of corn so that the loss of corn ears is reduced to a minimum.

A further object is to provide a stalk ejecting mechanism of the type referred to, which may be readily incorporated in the picker head of a corn-harvesting machine for conjoint operation with the corn stalk processing mechanism thereof.

An additional object is to provide a stalk ejecting mechanism of the type referred to, which when embodied in the picker head of a corn-harvesting machine is arranged in a manner to change the course of travel of the untreated upper stalk portions and/or the whole stalks of corn to thereby effect lateral ejection of said corn stalk portions and corn stalks from said picker head for final deposit on the field after the corn ears have been severed therefrom.

These and other objects of our invention will be apparent from the following description of the accompanying drawings which illustrate a preferred embodiment thereof and wherein:

Figure 1 is a plan view with certain parts broken away and others shown in section of a corn-harvesting machine, constructed in accordance with our invention, provided with a picker head which comprises two symmetrically arranged corn-processing channels.

Figure 2 is an enlarged plan view of the left half of the picker head with part of its covers removed.

Figure 3 is a vertical section on an enlarged scale through the left half of the picker head taken along line 3—3 of Figure 2 and viewed in the direction of the arrows associated with said line.

Figure 3a is an enlarged view of a portion of Figure 3.

Figure 4 is a horizontal section through the left half of the picker head taken along line 4—4 of Figure 3, certain parts being broken away.

Figure 5 is another vertical section on an enlarged scale through the left half of the picker head taken along line 5—5 of Figure 2.

Fig. 6 is a fragmentary plan view on an enlarged scale illustrating the front end of the processing mechanisms comprised in the left half of the picker head.

Figure 7 is an enlarged fragmentary side elevation of the picker head viewed in the direction of the arrows 7—7 of Figures 1 and 2 and illustrating the stalk-ejector mechanism provided in the left half of the picker head.

Figure 8 is an enlarged horizontal section through said stalk ejector mechanism taken along line 8—8 of Figure 7.

Figure 9 is a fragmentary perspective of the power train for the various mechanisms comprised in the left half of the picker head.

Having first reference to Figure 1, a corn-harvesting machine constructed in accordance with our invention and collectively identified by the reference numeral 15, is suitably mounted upon a tractor 16 that comprises a pair of cambered front wheels 17 and 18 and a pair of rear wheels 19 and 20 upon which is supported the motor 21 with the steering wheel 22 and the driver's seat 23. The picker head 25 of said corn-harvesting machine 15 comprises parallel processing channels 26 and 27 located respectively and symmetrically at each side of the tractor motor 21. The front end of the picker head 25 is formed by a centrally positioned gathering snout 28 that is flanked by two laterally positioned gathering snouts 29 and 30. The converging surfaces of said snouts are arranged to guide the stalks of two adjacent rows of corn into the processing channels 26 and 27 as the tractor 16 moves the machine across a corn field. Associated with said channels 26 and 27 are processing mechanisms 260 and 270 respectively, which are of symmetrically identical construction and operate in an identical manner to grip the corn stalks, sever the ears from the stalks, deliver the severed ears to a common ear-collecting vessel and dispose of the stalks. Accordingly only the processing mechanism 260 of the processing channel 26 will be described in detail hereinafter to explain the invention and the manner in which it operates.

Arranged within and extending longitudinally of channel 26, near the bottom end thereof, are two parallel rotors 31 and 32. The right one 32 of said rotors (as viewed from the front of the machine) comprises a shaft 33 the front end of which is rotatably supported by an arm 34 from a longitudinally extending vertical partition 35 located to the right of said shaft (Figures 5 and 6), while its rear end protrudes through and is suitably journalled in a transverse wall or partition 36 located rearwardly of the processing channel 26 (Figure 4). The left one 31 of said rotors comprises a shaft 37 the rear end of which protrudes through and is suitably journalled in the transverse partition 36 while its front end is rotatably mounted in a transverse plate 38 that is adjustably supported from the left side wall 39 of the picker head 25 by means of a screw member 40. Fitted upon the front ends of said shafts are conical noses 41 and 42 provided with oppositely threaded spiral welts 41a and 42a that are arranged to draw stalks of corn into the space between the rotors 31 and 32 whenever said rotors are turned in the direction indicated by the arrows 43 and 44 in Figures 5 and 9 with their adjacent segments moving downwardly. Each of the shafts 33 and 37 carries six elongated blades 45 and 46, respectively, which are staggered above one another in such a manner that their cutting edges 45a and 46a project above the rear edges 45b and 46b of the directly preceding blades in the above defined direction of rotation of the rotors 31 and 32, as shown in Figures 3 and 3a. Said blades 45 and 46 may be soldered to one another, as indicated at 47 in Figure 3a, so as to form integral sleeve-like structures that may readily be removed from their respective shafts whenever it is necessary to recondition or replace the blades.

Intermeshing gears 48 and 49 are firmly secured to the rear ends of the shafts 33 and 37, as shown in Figures 4 and 9, so that the rotors 31 and 32 may be turned in unison in opposite directions, as indicated by the previously mentioned arrows 43 and 44; and in the preferred embodiment of the invention illustrated in the accompanying drawings said rotors 31 and 32 are operationally aligned with one another in such a manner that their respective cutting edges 45a and 46a interlap. Thus, whenever the harvesting machine is moved over and along a row of corn and the spiral noses 41 and 42 draw the stalks of corn into the spaces between the rotating blades 45 and 46, the cutting edges 45a and 46a of said blades slice successively from opposite sides into said stalks, with the flat outer surfaces 46c and 45c of said blades acting as supports whenever the edge of an oppositely positioned blade slices into the stalk from the opposite side. In this manner the rotors 31 and 32 pull the stalks downwardly through the space between the blades 45 and 46 until the stem or shank of a corn ear comes into the range of the rotating blades and is severed by said blades.

To prevent the accumulation of stalk fragments, weeds or like matter at the edges of the blades 45 and 46 during practical operation of the rotors 31 and 32, suitable scraper bars 31a and 32a may be associated with said rotors, as indicated in Figure 3.

Referring again to Figure 3, it should be noted that the rotors 31 and 32 are spaced sufficiently far apart to prevent the cutting edges 45a and 46a from severing the stalks completely, for if the action of the cutting edges were such as to sever intermediate stalks completely, the upper portions of the stalks would simply be chopped off and the rotors 31, 32 would lose control of the stalks. As a result thereof the upper stalk portions would remain above and fall lengthwise onto the rotors which is liable to jam the rotors and bruise or otherwise injure the corn ears that grow on said upper stalk portions. By spacing the rotors 31 and 32 sufficiently apart to avoid complete severing of the stalks and by providing each of said rotors with as many as six successive blades that bite in rapid succession into the stalks from opposite sides thereof, the rotary cutters 31, 32 retain a continuous and uniform grip upon the stalks and pull them fully down to the ground while making numerous overlapping incisions into said stalks over their total length (Figure 3) which weaken the structure of said stalks sufficiently to cause them to break into pieces as the machine advances across the field, and the shanks of all the corn ears, no matter how high they may grow on said stalks, are dependably drawn into the range of action and seevred by the blades of said rotary cutters 31 and 32.

Suitably supported from the aforementioned partition 35, directly above the range of action of the right one 32 of the rotary cutters, is a horizontal deck plate 50 the inner edge of which is bent slightly in downward direction to form a rounded rim 51 that extends above and parallel to said rotary cutter 32 over the full length thereof (Figures 3 and 4). Arranged adjacently to the left one 31 of said rotary cutters is a trough 53 of semi-circular contour that forms part of a helical conveyor 54 which extends all the way from the front to the rear end of the corn-harvesting machine (Figure 1) and comprises a longitudinal shaft 55 which carries a helical conveyor fin 56. The trough 53 has an inwardly directed lip 57 that extends parallel to and is situated slightly above the range of action of the rotary cutter 31, as best shown in Figure 3, and disposed directly above and parallel to said lip is a bar 58, which jointly with the rounded rim 51 form a corn stalk guide channel or gap 66 in a manner now to be described. The rear end of said bar 58 is adjustably anchored in an aperture 59 (Fig. 2) provided in said lip 57 directly behind the rear end of the rotor blades, while its front end is bent outwardly at right angles (Fig. 6) to form a transversely extending arm 60 that is adjustably mounted in the left side wall 39 of the machine, as shown at 61, so that the position of said bar transversely of the processing channel 26 may be varied if desired. In addition the bent front portion 60 of said bar 58 may suitably be connected (Figs. 5 and 6) to a vertical screw member 62 that is adjustably held in a horizontal deck plate 65 which is supported from the aforementioned side wall 39 of the machine a suitable distance above the helical conveyor 54. By means of the described members 60 and 62 the gap 66 (Fig. 5) between the bar 58 and the inner rim 51 of the aforementioned deck plate 50 may be adjusted depending upon the average diametrical width of the ear butts of the particular type of corn to be harvested by the machine of the invention so as to maintain the corn ears above the rotary cutters 31, 32. With the gap 66 properly adjusted, most corn ears are held out of the range of action of said rotary cutters 31, 32 as said cutters pull the stalks to the ground in the manner previously described, and when a corn ear comes against and is retained by the bar 58 and the rim 51 while the cutters 31, 32 continue to pull the stalk in downward direction, the shank of the ear is stretched so that it will readily be cut by one of the blades of said rotary cutters 31, 32.

All ears attached to the stalk at the side of the conveyor trough 53 will naturally drop into said trough wherein the conveyor 54 delivers them to the rear end of the machine. Normally, however, the corn ears grow from all points of the stalk circumference and to make sure that all ears, no matter where they grow on the stalk, may dependably fall into the aforementioned trough 53, another horizontal deck plate 68 is supported from the right partition 35 a suitable distance above the previously mentioned deck plate 50. Above the rim 51 of said lower deck plate 50 the deck plate 68 is bent downwardly to form a vertical deflector wall 69, and whenever a stalk of corn passes into the processing channel 26, said deflector wall 69 is effective to twist corn ears growing at all sides other than above the trough 53 in the direction of the trough so that they drop into said trough whenever their shanks reach the range of action of and are severed by one of the rotary cutters 31, 32. The effect of the deflector wall 69 may be supported by mounting the right one 32 of the rotary cutters somewhat higher than the left cutter 31, which tends to tilt the stalks in the direction of the trough 53, as illustrated in phantom lines in Figures 3 and 5.

In order that the stalks delivered into the processing channel 26 may arrive in upright position and may remain in such a position when they are processed in the above described manner by the rotary cutters of the machine while the machine advances along the rows of corn, two vertically spaced gathering chains 71 and 72 may be arranged to operate along the right side of said channel and a third gathering chain 73 may be arranged to operate along the left side thereof. Having reference to Figures 2, 3, 4 and 5, the gathering chains 71 and 72 are trained around sprockets 75 and 76, respectively, that are firmly mounted upon a common vertically positioned shaft 77 which is suitably journalled in the machine frame at a point rearwardly of the blades of the rotary cutters 31, 32. Said chains 71, 72 extend directly above the aforementioned lower and upper deck plates 50 and 68, respectively, with their front ends trained around suitable idler sprockets 78 and 79 that may be adjustably mounted upon said deck plates 50 and 68, as shown at 81 and 82 in Figures 2 and 4. The left gathering chain 73 is trained around a sprocket 83 (Figs. 2 and 3) that is firmly secured to a stub shaft 84 which is mounted upon the left hand deck plate 65 rearwardly of the blades of the rotary cutters 31, 32. The forward end of said gathering chain 73 is trained around an idler sprocket 85 that is adjustably mounted upon the left deck plate 65 near the front end of the left side snout 29, as shown at 86 in Figures 2 and 4, and a skid shoe 87 supported from said deck plate 65 by means of an adjustable slide 88 aligns the inner run of said gathering chain 73 with the inwardly slanting guide wall 89 of the snout 29 and the longitudinally extending inner edge of the left hand deck plate 65, as best shown in Figure 4. The gathering chains 71, 72 and 73 may be of conventional construction possessing numerous outwardly projecting lugs 90, arranged at equal intervals along the circumference of said chains and adapted to engage the corn stalks and pull them inwardly toward and through the processing channel 26.

As previously indicated, the helical conveyor 54 transports the ears dropping into the trough 53 to the rear end of the machine where they slide down a short inwardly inclined gravity chute 92 into the lower end of a centrally positioned conveyor 93 (Fig. 1) that is swiveled to the rear end of the machine and which is arranged to raise the ears above the walls of a trailing collector truck (not shown). A blower 94 may be mounted above said gravity chute 92 to separate small stalk fragments and like impurities from the ears in the customary manner before they are delivered into the collector truck.

In practical operation corn stalks may accidentally be severed completely and relatively long stalk sections may therefore remain above the rotary cutters 31, 32 and clog the rear end of the processing channel 26 or drop into the trough 53 and jam the helical conveyor 54. Means are therefore provided in accordance with the invention which eject such long stalk sections laterally from the interior of the picker-head so that they cannot interfere with the proper operation of the rotary cutters or stop the flow of the severed ears to the rear of the machine. For this purpose an opening 95 is provided in the left outer side wall 39 of the picker-head near the rear end of the processing channel 26 (Figs. 2 and 8) and an endless gathering chain 96 having lugs or elements 96' is arranged to extend transversely across said processing channel 26 and the conveyor 54 and the other end of the chain 96 may, to a limited extent, project through the opening 95. Said gathering chain 96 is operated in such a direction (Fig. 9) that its front run drags or bends elongated stalk sections that may accumulate at the rear end of the processing channel 26 or clog the conveyor 54, sideways toward the aforementioned lateral opening 95. Mounted in front of said opening exteriorly of the picker-head are two vertically positioned stalk and general debris ejecting rotors, such as paddle wheels 98 and 99 (Figs. 7 and 8) each of which may have four paddle blades 101 and 102, respectively, that are arranged to interlap. During operation of the machine said paddle wheels are turned continuously in opposition in the directions indicated by the arrows 103 and 104 in Figure 8 and grip the ends of stalk sections that may project through the opening 95 and pull such stalk sections positively from the interior of the picker head. The gathering chain 96 is preferably arranged to operate within a converging passage 105 (Figs. 2 and 8) that is formed between a transverse wall 106 of the picker head which is positioned rearwardly of said chain 96 and a guide panel or wall 107 that is positioned in confronting relation with the chain 96 and extends in an arc from a point above the shaft 55 of the helical conveyor 54 to the forward edge of the opening 95 in the left side wall 39 of the picker head (Figs. 2 and 8). To retain ears that may still be attached to the stalk sections, the end of said converging passage 105 is partially blocked by the outer side wall 39 of the picker head, as indicated at 108 in Figures 2 and 8, so that the opening 95 is only wide enough to readily pass stalks but is sufficiently narrow to impede the passage of corn ears. Thus, ears attached to stalk sections that are dragged through the converging passage 105 by the action of gathering chain 96, will in most instances strike against the wall portion 108 that partially blocks the end of the passage 105, as shown in Figure 8, and will be snapped from the stalks as the paddle wheels 98 and 99 pull the stalks positively from the interior of said passage 105. Even if corn ears should happen to arrive properly centered with the opening 95, the small dimensions of said opening will prevent most of such ears from passing to the outside. Hence, in practice only a very small number of relatively small corn ears will actually escape from the picker head with the ejected stalk sections, while by far the greater part of them is snapped from the stalk sections and drops into the conveyor 54 underneath to be carried to the rear end of the machine and delivered into the ear collector truck in the manner previously described. To adapt the described ejector mechanism for operation with different types of corn, means may be provided to adjust the width of opening 95, such as the plate 109 that is adjustably secured to the wall portion 108, as shown in Figure 8.

All the moving elements of the described corn-harvesting mechanism may conveniently be driven from a common source of power which will usually be the tractor motor 21. Having reference to Figure 9, a sprocket chain 110 transmits the rotary motion of a power take-off shaft (not shown) to a sprocket 111 that is keyed to a transverse shaft 112. Said transverse shaft 112 carries a bevel gear 114 which meshes with another bevel gear 115 that is keyed upon a longitudinally extending shaft 116 which is suitably coupled to the previously mentioned shaft 33 of rotor 32 and drives said rotor in the direction of the arrow 44. Keyed to the end of said shaft 33 is the aforementioned gear 49 that meshes with the gear 48 which is keyed to the end of the aforementioned shaft 37 of rotor 31. Thus, whenever the rotor 32 is driven in the direction of the arrow 44, the rotor 31 is driven at equal speed in the opposite direction, as previously explained.

Keyed to the aforementioned longitudinal shaft 116 is a sprocket 118 and a sprocket chain 119 trained around said sprocket 118 transmits the rotary motion of said shaft to another sprocket 120 that is keyed to another longitudinally extending shaft 121. Firmly mounted upon said shaft 121 is a bevel gear 122 which meshes with another bevel gear 123 that is keyed to the vertical shaft 77 which carries the sprockets 75 and 76 that drive the gathering chains 71 and 72, as previously explained. Firmly secured to the upper end of the vertical shaft 77 is a third sprocket 125 which drives the transverse gathering chain 96 of the stalk ejector mechanism. The outer end of said transverse gathering chain is trained around a sprocket 126 that is keyed to the upper end of a vertical shaft 127 which is rotatably supported from the side wall 39 of the picker head in front of the ejector opening 95 and drives the paddle wheel 98 (Figures 7 and 8). Secured to the bottom end of said shaft 127 is a gear 128 which meshes with another gear 129 of identical construction that is keyed to another vertical shaft 130 which drives the paddle wheel 99. Likewise secured to said shaft 130 is a sprocket 131 which drives a sprocket chain 132 that is trained around another sprocket 133 which is keyed to the lower end of a vertical idler shaft 134. Said idler shaft is rotatably supported from the side wall 39 of the picker head and carries on its upper end another sprocket 135 which drives a sprocket chain 136 that is trained around another sprocket 137 (Fig. 3). Said sprocket 137 is integral with the vertical shaft 84 which carries the sprocket 83 that drives the left gathering chain 73.

Reverting to shaft 116 (Figure 9), said shaft carries a sprocket 140 which drives a sprocket chain 141 that is trained around another sprocket 142 keyed to an auxiliary shaft 143. Firmly mounted upon the rear end of said auxiliary shaft 143 is a small sprocket 144 which is operatively connected by means of a sprocket chain 145 to a large sprocket 146 that is keyed to the rear end of the shaft 55 which drives the helical conveyor 54, as previously explained. By properly proportioning the relative sizes of the described gears and sprockets, the rotary cutters 31, 32, the gathering chains 71, 72 and 73, the helical conveyor 54 and the paddle wheels 98 and 99 may be made to operate at their proper speeds.

While the present invention has been described with the aid of an exemplary embodiment thereof it will be understood that it is not limited to the specific constructional details shown and described that may be departed from without departing from the scope and the spirit of our invention.

We claim:

1. In a corn-harvesting machine picker head having a side and a rear wall with a discharge opening in each wall and corn stalk processing mechanism mounted in the head and arranged to move ears of corn and portions of corn stalks rearwardly through the picker head toward the rear wall, the combination of stalk-gathering means mounted in said head and having a first portion adjacent the side wall opening and a second portion extending along said rear wall of the head, said stalk gathering means being arranged to intercept portions of stalks as they are moved rearwardly by said processing mechanism and to direct the stalks transversely of said picker head toward the opening in said side wall, and means mounted adjacent the opening in said side wall and operable conjointly with said stalk gathering means to engage the portions of corn stalks and eject them through the side opening.

2. A combination as defined in claim 1, wherein the last mentioned means includes a pair of overlapping stalk engaging and ejecting rotors.

3. In a corn-harvesting machine picker head having a side and a rear wall with a discharge opening in each wall and corn stalk processing mechanism mounted in the head and arranged to move ears of corn and portions of corn stalks rearwardly through the picker head toward the rear wall, the combination of stalk gathering means mounted in said head for movement transversely of the path of movement of the stalks and arranged to intercept and engage portions of stalks as they are moved rearwardly by the processing mechanism and to move the stalks toward the opening in said side wall, and means mounted adjacent one end of said stalk gathering mechanism and adjacent the opening in said side wall and operable conjointly with said stalk gathering means to engage and effect ejection of the stalk portions from the picker head.

4. A combination as defined in claim 3, wherein the last mentioned means includes a pair of interlapping stalk engaging and ejecting paddle wheels arranged exteriorly of said picker head.

5. In a corn-harvesting machine picker head having a side and a rear wall with a discharge opening in each wall and corn stalk processing mechanism mounted in the head and arranged to move ears of corn and portions of corn stalks rearwardly through the picker head toward the rear wall, the combination of stalk gathering means mounted in the picker head and extending in a substantially transverse manner across said corn stalk processing mechanism in spaced relation thereabove, one end of said gathering means being disposed adjacent the opening in the side wall and the other end being disposed in the path of the rearwardly moving corn stalks to intercept said stalks and direct them toward said side wall opening and at a level above said processing mechanism, means mounted adjacent the discharge end of said stalk gathering means for snapping corn ears from said stalks, and means mounted exteriorly of said picker head in contiguous relation to said one end of said stalk gathering means and operable conjointly therewith for engaging and effecting ejection of said stalks from said picker head after the corn ears have been snapped therefrom.

6. A combination as defined in claim 5, wherein the last mentioned means includes a pair of interlapping stalk engaging and ejecting rotors arranged to rotate about parallel vertical axes.

7. In a corn-harvesting machine picker head having a side and a rear wall with a discharge opening in each wall and corn stalk processing mechanism mounted in the head and arranged to move ears of corn and portions of corn stalks rearwardly through the picker head toward the rear wall, the combination of a stalk gathering chain mounted in said head directly above the corn processing mechanism for movement in a direction substantially transversely of the path of movement of rearwardly moving corn stalks, one portion of said chain being disposed adjacent the opening in the side wall and another portion being disposed in the path of movement of the corn stalks, a guide wall mounted within said picker head in confronting relation to said gathering chain and leading from the interior of said head to a point adjacent the opening in the side wall, and means mounted exteriorly of said side wall adjacent said opening and operable conjointly with said stalk gathering chain for engaging and effecting the ejection of the corn stalks from the picker head.

8. A combination as defined in claim 7, wherein the guide wall is of arcuate formation and is located in front of the stalk gathering chain.

9. In a corn-harvesting machine picker head having a side and a rear wall with a discharge opening in each wall and corn stalk processing mechanism mounted therein and arranged to move ears of corn and corn stalks rearwardly through the picker head toward the rear wall, the combination of a stalk gathering chain extending across said corn stalk processing mechanism intermediate the length thereof and mounted in substantially perpendicular superposed relation thereto, walls arranged in said head at each side of said gathering chain to form a passage leading from the interior of said picker head to the opening in the side wall, means for blocking part of the outer end of said passage, and means mounted exteriorly of said side wall opening and operable conjointly with said gathering chain for engaging and ejecting the corn stalks from said picker head.

10. A combination as defined in claim 9, wherein the walls are arranged to form an outwardly converging passage.

11. A combination as defined in claim 9, wherein the blocking means is adapted to also sever corn ears from the whole stalks prior to their ejection from said picker head.

12. In a corn-harvesting machine picker head having a side and a rear wall with a discharge opening in each wall and corn stalk processing mechanism adapted to snap the ears from stalks of corn while pulling said stalks to the ground and adapted to move ears of corn and corn stalks rearwardly toward the rear wall, the combination of a stalk gathering chain arranged substantially transversely of and directly above said processing mechanism adjacent said rear wall of the picker head, said gathering chain having an outer end portion adjacent the opening in said side wall and having a portion adapted to contact corn stalks accumulated against said rear wall and move them toward said side wall opening, and a pair of cooperating stalk engaging rotors positioned adjacent the outer end of said chain and adjacent said side wall opening and arranged to urge the corn stalks through said opening.

13. In a corn harvester picker head having a side and a rear wall with a discharge opening in each wall and corn stalk processing mechanism arranged to receive corn stalks at a forward end portion, separate ears of corn from the stalks, move the ears rearwardly in a conveyor trough through the discharge opening in the rear wall and move portions of corn stalks and trash to an accumulating position against the rear wall, the combination of a stalk gathering endless chain mounted in said head extending transversely of the head along the rear wall and directly above said trough, said chain having one end portion extending through the opening in said side wall, elements on said chain adapted to engage portions of corn stalks accumulating against said rear wall and move said portions through said side wall opening, and an abutment plate secured to said side wall in overlapping relation to said side wall opening and restricting said opening to a size smaller than the size of an average ear of corn, said abutment plate being located above one lateral edge of the conveyor trough whereby ears snapped from corn stalks by said abutment plate fall directly into said trough.

14. In a corn harvester picker head having a side and a rear wall with a discharge opening in each wall and corn stalk processing mechanism arranged to receive corn stalks at a forward end portion and separate ears of corn from the stalks as the stalks and ears are moved rearwardly toward the discharge opening in the rear wall, the combination of a first sprocket journaled for rotation in said picker head adjacent said rear wall, a second sprocket journaled for rotation on said head adjacent the opening in the side wall but exteriorly of said opening, a stalk-gathering chain trained around said sprockets, and elements on said chain arranged to contact stalks accumulating in the head near the rear wall and urge them laterally through the opening in said side wall.

References Cited in the file of this patent

UNITED STATES PATENTS

| | | |
|---|---|---|
| 1,160,777 | Small | Nov. 16, 1915 |
| 1,303,298 | Hagadone | May 13, 1919 |
| 1,821,985 | Peterson | Sept. 8, 1931 |
| 2,223,704 | Powell | Dec. 3, 1940 |
| 2,651,163 | Aasland | Sept. 8, 1953 |